(12) United States Patent
Alfano

(10) Patent No.: US 7,968,244 B2
(45) Date of Patent: Jun. 28, 2011

(54) FUEL SUPPLY MANIFOLD ASSEMBLY

(75) Inventor: Bryan L. Alfano, Manchester, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 1202 days.

(21) Appl. No.: 11/464,657

(22) Filed: Aug. 15, 2006

(65) Prior Publication Data

US 2007/0037038 A1 Feb. 15, 2007

Related U.S. Application Data

(60) Provisional application No. 60/708,352, filed on Aug. 15, 2005.

(51) Int. Cl.
*H01M 8/02* (2006.01)
*H01M 8/04* (2006.01)
*F17D 1/00* (2006.01)

(52) U.S. Cl. ......... 429/458; 429/444; 429/446; 137/266

(58) Field of Classification Search .................... 429/34, 429/23, 13, 19, 38, 25, 17, 30, 32, 458, 446, 429/444, 462, 452, 544; 137/266
See application file for complete search history.

(56) References Cited

U.S. PATENT DOCUMENTS

| 6,127,056 | A * | 10/2000 | Wheeler et al. ................. 429/13 |
| 6,739,578 | B2 | 5/2004 | Barton et al. ................ 251/149.9 |
| 6,824,911 | B2 | 11/2004 | Franklin ......................... 429/38 |
| 2003/0022041 | A1 * | 1/2003 | Barton et al. ................... 429/23 |
| 2003/0194596 | A1 * | 10/2003 | Ye et al. .......................... 429/38 |
| 2003/0198846 | A1 | 10/2003 | Franklin |
| 2004/0023083 | A1 | 2/2004 | Yang et al. ....................... 429/13 |
| 2004/0121218 | A1 | 6/2004 | Andrews ......................... 429/38 |
| 2004/0214054 | A1 | 10/2004 | Shige et al. |
| 2004/0258965 | A1 | 12/2004 | Christie et al. .................. 429/19 |
| 2005/0014042 | A1 | 1/2005 | Brenner et al. |
| 2005/0112424 | A1 | 5/2005 | Hirano et al. |

(Continued)

FOREIGN PATENT DOCUMENTS

DE 10052174 5/2001

(Continued)

OTHER PUBLICATIONS

Machine translation of DE 10127599, Dec. 2002.*

(Continued)

*Primary Examiner* — Jonathan Crepeau
*Assistant Examiner* — Kenneth Douyette
(74) *Attorney, Agent, or Firm* — Renner, Otto, Boisselle & Sklar, LLP

(57) ABSTRACT

A fuel supply manifold assembly (20) comprising a manifold (40), one or more supply inlet connections (42), pressure readers (44, 46), a manual turnoff (50), pressure-reducing devices (52,54), a pressure-relieving device (56), a flow-control device (60), and a delivery outlet port (62). The manifold (40) defines a flow path from the supply inlet connection (s) (42) to the delivery outlet port (62). The flow path passes through the pressure readers (44, 46), the manual turnoff (50), pressure-reducing devices (52,54), the pressure-relieving device (56), the flow-control device (60). When installing the fuel supply manifold assembly (20) at a fuel cell site, one inlet connection for each fuel source and one outlet connection is required. No separate connections, tubing, hoses, or other plumbing is required to integrate other the components into the fuel flow path to the anode side of the fuel cell stack.

18 Claims, 8 Drawing Sheets

U.S. PATENT DOCUMENTS

| | | |
|---|---|---|
| 2005/0164071 A1 | 7/2005 | Horiguchi |
| 2005/0178432 A1 | 8/2005 | Porter et al. .................... 137/14 |

FOREIGN PATENT DOCUMENTS

| | | |
|---|---|---|
| DE | 10116753 | 10/2001 |
| DE | 10050981 | 4/2002 |
| DE | 10202875 | 8/2002 |
| DE | 10201668 | 11/2002 |
| DE | 10127599 | * 12/2002 |
| DE | 10231208 | 1/2004 |
| DE | 10347139 | 5/2004 |
| DE | 10327535 | 1/2005 |
| DE | 10347793 | 5/2005 |
| DE | 102004060564 | 7/2005 |
| EP | 1271680 | 1/2003 |
| WO | 03010845 | 2/2003 |

OTHER PUBLICATIONS

PCT/US2006/031782; PCT International Search Report mailed Feb. 12, 2007.

* cited by examiner

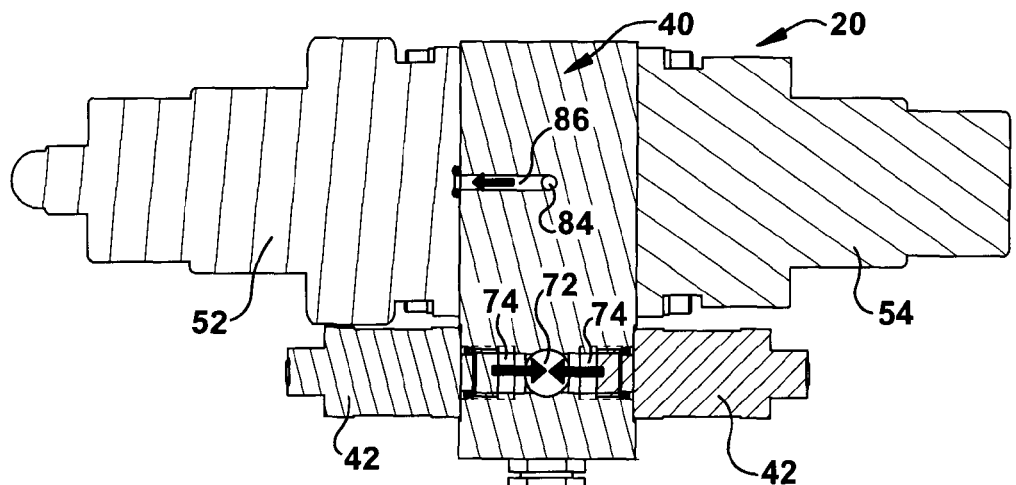
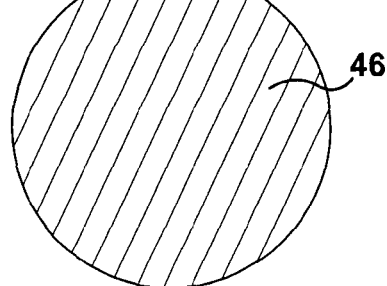
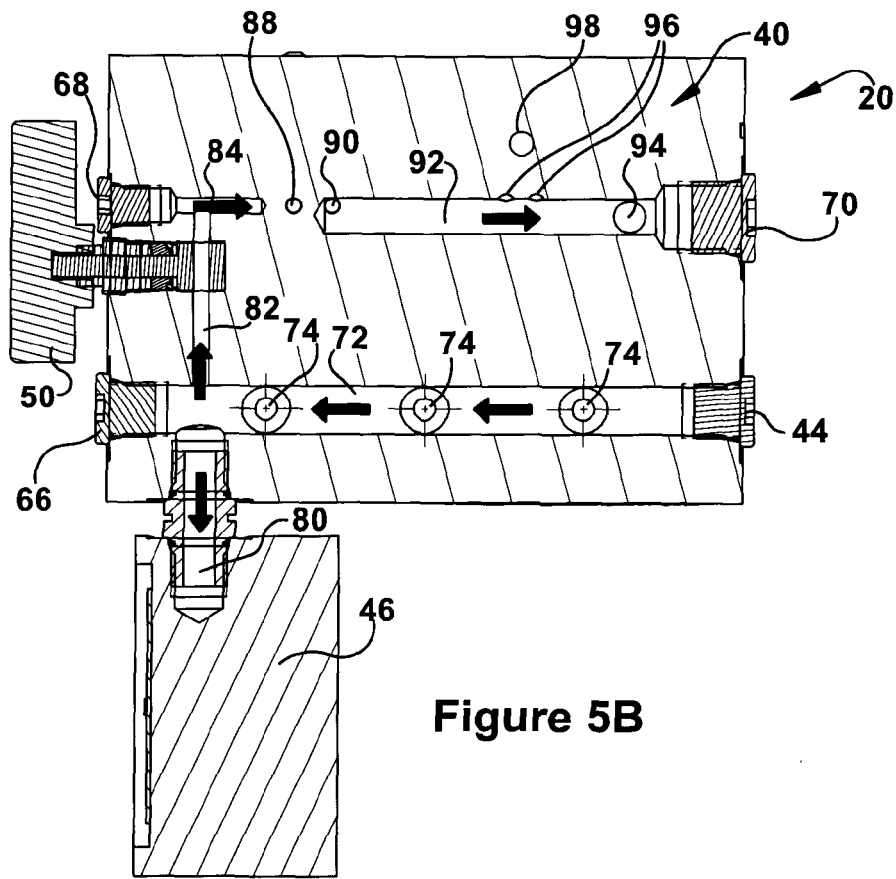
Figure 5A
Figure 5B

FUEL SUPPLY MANIFOLD ASSEMBLY

RELATED APPLICATION

This application claims priority under 35 U.S.C. §119 (e) to U.S. Provisional Patent Application No. 60/708,352, filed on Aug. 15, 2005. The entire disclosure of this provisional application is hereby incorporated by reference.

GENERAL FIELD

This disclosure relates generally to a fuel supply manifold assembly for supplying a hydrogen-containing gas to the anode side of a fuel cell stack.

BACKGROUND

A fuel cell system comprises a stack of cells which, when coupled, provide a desired power output. Once assembled, the fuel cell system has a cathode side and an anode side which can be treated as two separate systems. An electrolyte (or ion-conducting) separator is positioned between the cathode side and the anode side. During operation of the fuel cell system, oxygen-containing gas (e.g., atmospheric air) passes through the cathode side, hydrogen-containing gas passes through the anode side, and the gasses react to generate electricity.

The hydrogen-containing gas is typically supplied from one or more bottles at a high pressure (e.g., about 2000 psi to about 3500 psi). As the anode side usually requires the introduction of the hydrogen-containing gas at a significantly lower pressure (e.g., about 5 psi to about 6 psi), the gas must pass through one or more pressure-reducing devices (e.g., regulators) upstream of the fuel cell stack. A flow-controlling device (e.g., a solenoid valve), downstream of the pressure-reducing devices, can be selectively opened to allow the passage of the hydrogen-containing gas to the fuel cell stack. Other components (e.g., manual shutoffs, pressure readers, over-pressure protection, etc) are often also necessary or desired.

SUMMARY

A fuel supply manifold assembly is provided which incorporates, in a single package, the components necessary for supplying a pressurized hydrogen-containing gas to a fuel cell stack. When installing the fuel supply manifold assembly at the fuel cell site, one inlet connection for each fuel source and one outlet connection is required. No separate connections, tubing, hoses, or other plumbing is required to integrate other components (e.g., pressure-reducing devices, flow-controlling devices, manual shutoffs, pressure readers, and/or over-pressure protection, etc) into the supply-to-delivery flow path. This greatly reduces installation steps, and related assembly errors, at the fuel cell site. Also, the manifold manufacturer can inspect, test, correct and/or confirm the construction, the integrity and/or the fluid-tightness of the assembly at is factory. The manufacturer is no longer at the mercy of plumbing performed at the fuel cell site. These and other features of the supply manifold assembly are fully described and particularly highlighted in the claims. The following description and annexed drawings set forth detail a certain illustrative embodiment, this embodiment being indicative of but one of the various ways in which the principles may be employed.

DRAWINGS

FIGS. 5A, 5B, 5C, 5D, 5E, and 5F are sectional views taken along lines 5A-5A, 5B-5B, 5C-5C, 5D-5D, 5E-5E and 5F-5F respectively.

Figure 6:
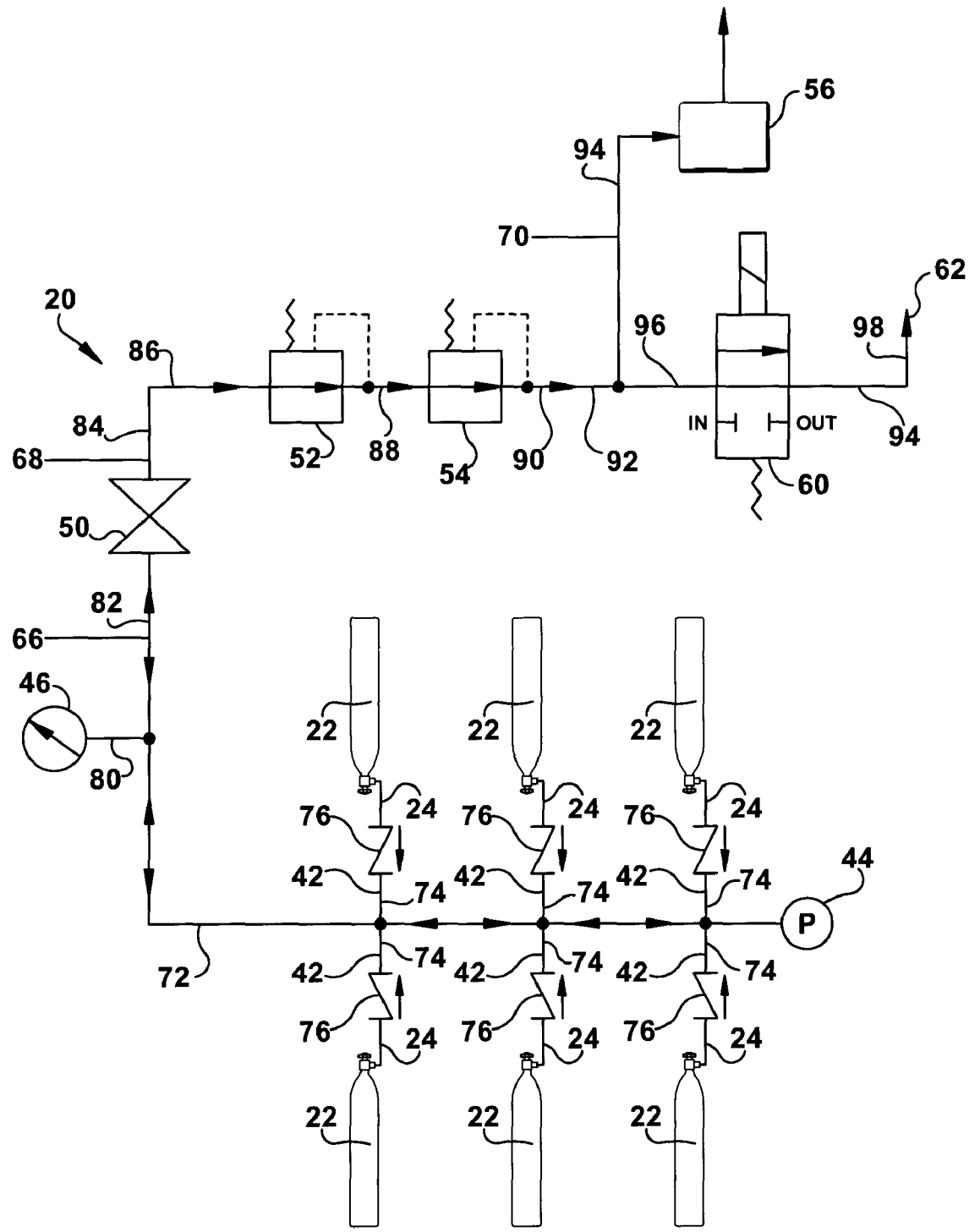

FIG. 6 is a schematic diagram showing the components of the manifold assembly and the flow of fuel therethrough.

DETAILED DESCRIPTION

Figure 1:
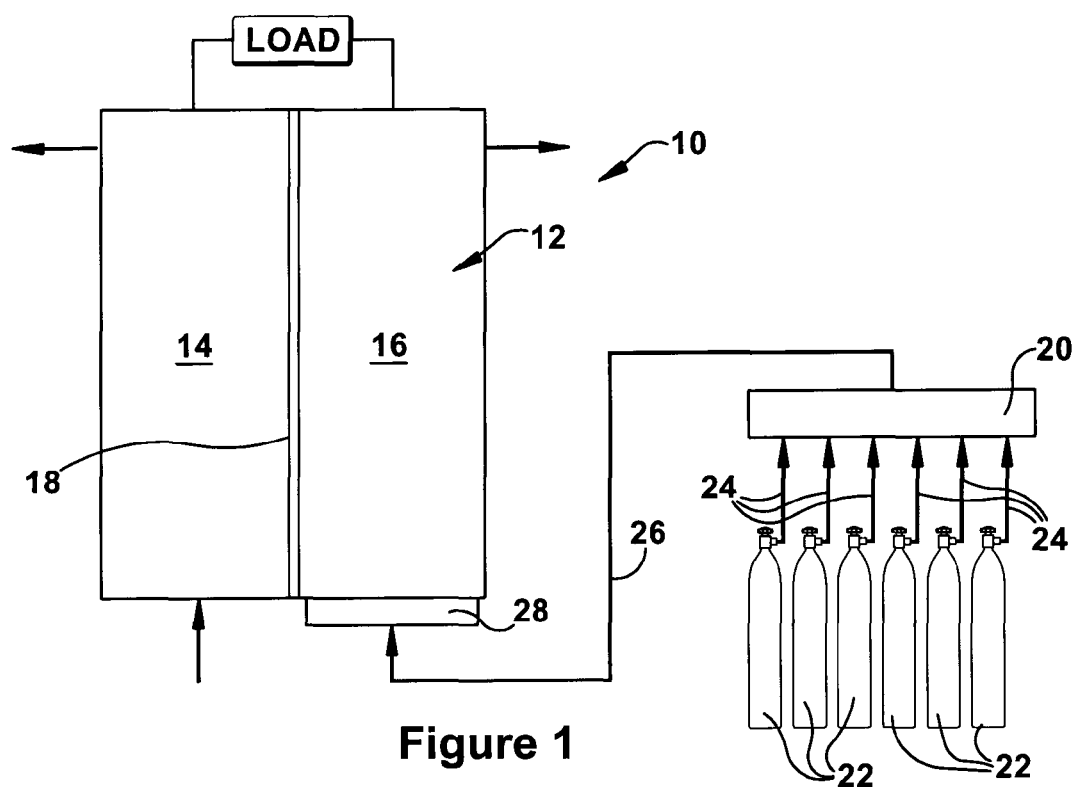
FIG. 1 is a schematic illustration of a fuel cell system including a fuel cell stack, and a fuel supply manifold assembly.

Referring now to the drawings, and initially to FIG. 1, a fuel cell system 10 is shown. The fuel cell system 10 comprises a stack 12 of cells which, when coupled, provide the desired power output. Once assembled, the fuel cell system 10 has a cathode side 14 and an anode side 16 which can be treated as two separate systems. An electrolyte (or ion-conducting) separator 18 positioned is between the cathode side 14 and the anode side 16. During operation of the fuel cell system 10, oxygen-containing gas (e.g., atmospheric air) passes through the cathode side 14, hydrogen-containing gas passes through the anode side 16, and the gasses react to generate electricity.

The fuel cell system 10 further comprises a fuel supply manifold assembly 20 which receives hydrogen-containing gas from one or more sources 22 and supplies the hydrogen-containing gas to the fuel cell stack 12. The source(s) 22 can comprise bottles each containing pressurized gas (e.g., about 2000 psi to about 3500 psi) and each having a supply line 24 (e.g., a hose) leading to the fuel supply manifold assembly 20. The illustrated fuel cell system 10 has six supply bottles 22, but the fuel supply manifold assembly 20 could certainly be adapted to accommodate more or less bottles. In any event, after the hydrogen-containing gas travels through the fuel supply manifold assembly 20 it is delivered to the fuel cell stack 12 via a delivery line 26. The fuel cell system 10 can, as shown, include a separate manifold 28 which receives the hydrogen-containing gas prior to its introduction to the cathode side 14.

Figure 2:
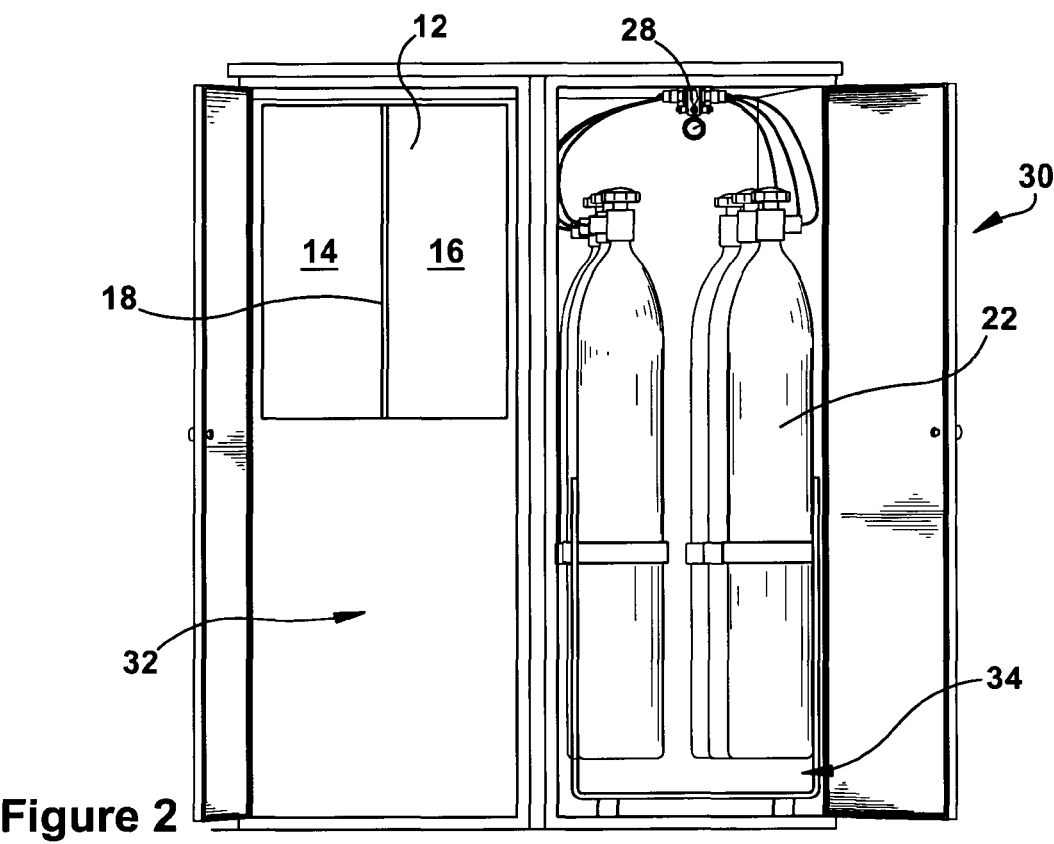
FIG. 2 is a perspective view of a cabinet for the fuel cell system.
Figure 3:
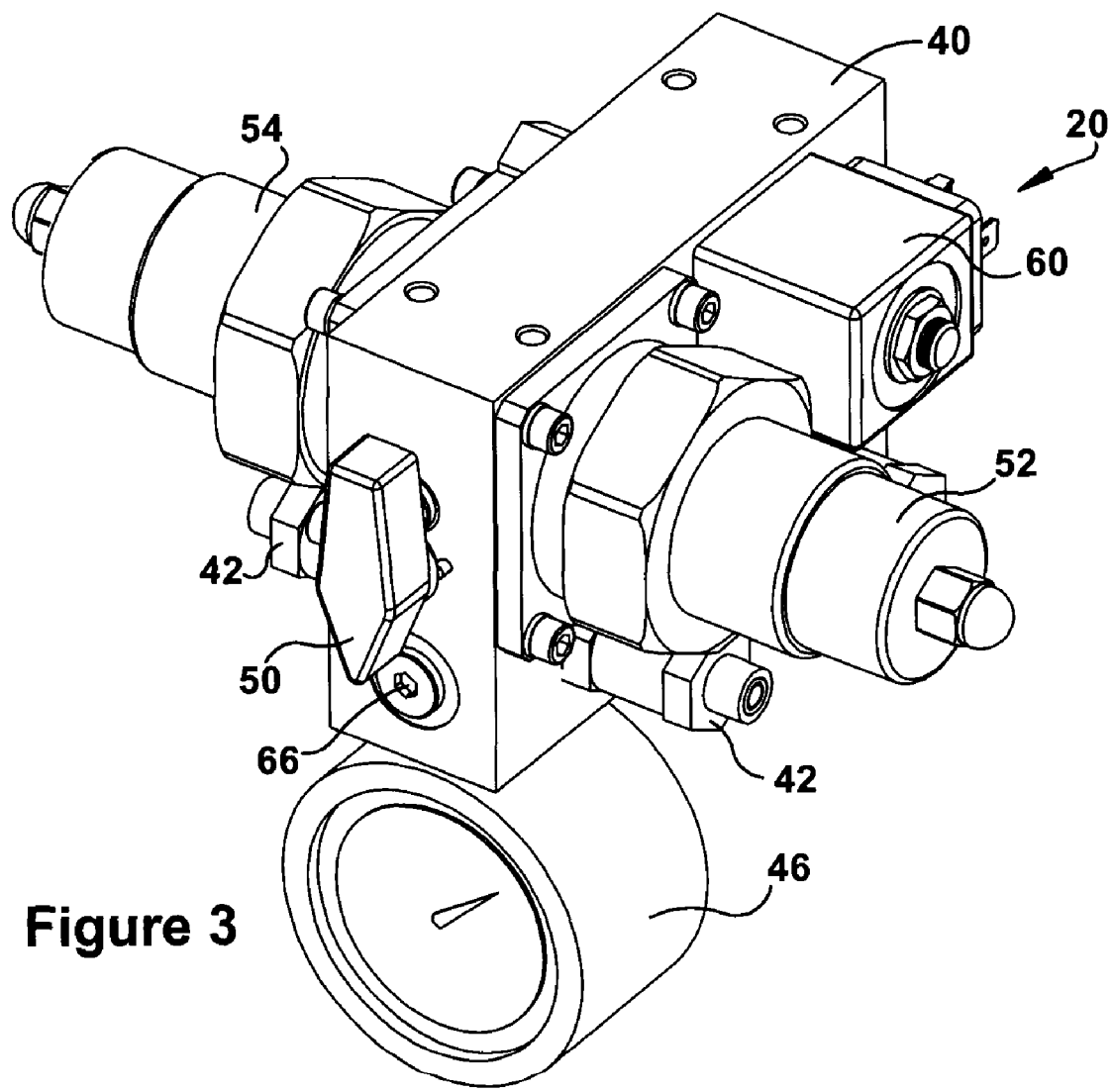
FIG. 3 is a perspective view of the fuel supply manifold assembly.

Referring to FIG. 2, the fuel cell system 10 may be situated within a cabinet 30. The cabinet 30 can have a first compartment 32 forming an enclosure for the fuel cell stack 12, and a second compartment 34 forming an enclosure for the fuel supply manifold assembly 20 and the source bottles 22. In the illustrated embodiment, six bottles 22 are positioned in two rows on the floor of the second compartment 34, and the fuel supply manifold assembly 20 is mounted to its ceiling. The delivery line 26 extends from the assembly 20 in the first compartment 32 through an appropriate opening to the second compartment 34 for delivery of the hydrogen-containing gas to the fuel cell stack 12.

Referring now to FIG. 3 and FIGS. 4A-4D, the fuel supply manifold assembly 20 is shown isolated from the rest of the fuel cell system 10. The fuel supply assembly 20 generally comprises a manifold 40, supply inlet connections 42, a pressure transducer device 44, a pressure gauge 46, a manual turnoff device 50, a first pressure-reducing device 52, a second pressure-reducing device 54, a pressure-relieving device 56, a flow-control device 60, and a delivery outlet port 62. The delivery outlet port 62 is intended for connection to the delivery line 26 at the site of the fuel cell stack 12 and it may be temporarily closed by a plug 64. The manifold 40 can also include a plugged opening 66, a plugged opening 68, and/or a plugged opening 70.

The manifold 40 can be made of, for example, 6061 T6 Aluminum. The manifold can comprise a one-piece block which is machined, molded, or otherwise formed into the desired shape. For the purposes of the present discussion, a manifold refers to a single component which does not require separate tubes, hosing, or plumbing for interconnection between its various parts. Thus, the manifold 40 could be constructed from separate parts or pieces, provided that external plumbing between these parts is not necessary.

Figure 4A:
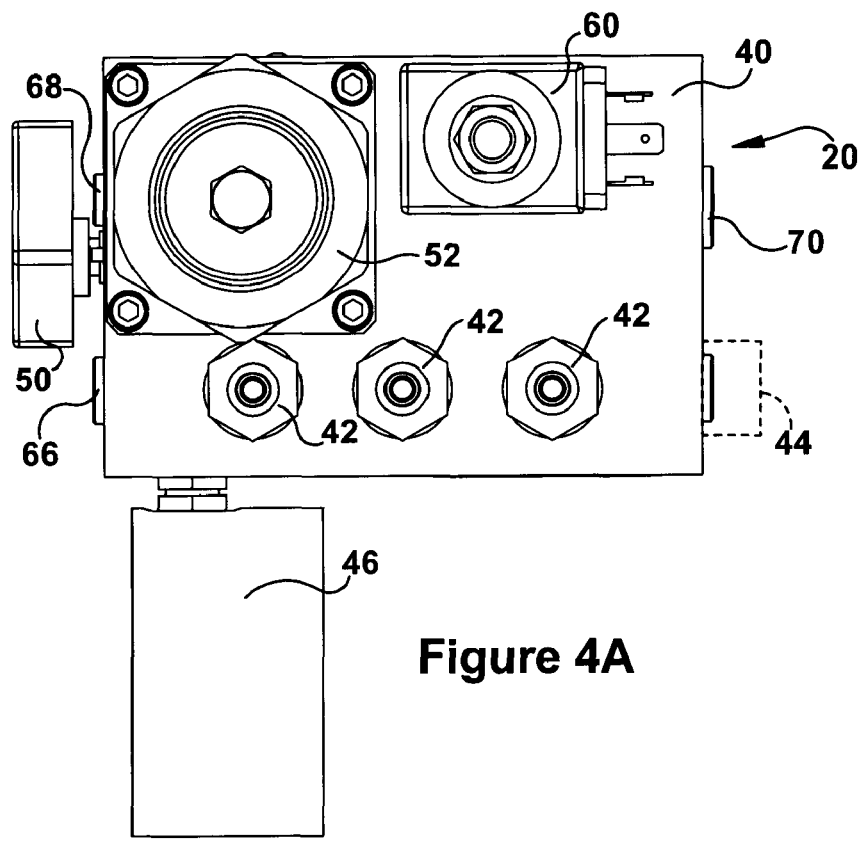
FIGS. 4A, 4B, 4C and 4D are front, rear, side and top views, respectively, of the fuel supply manifold assembly.
Figure 4B:
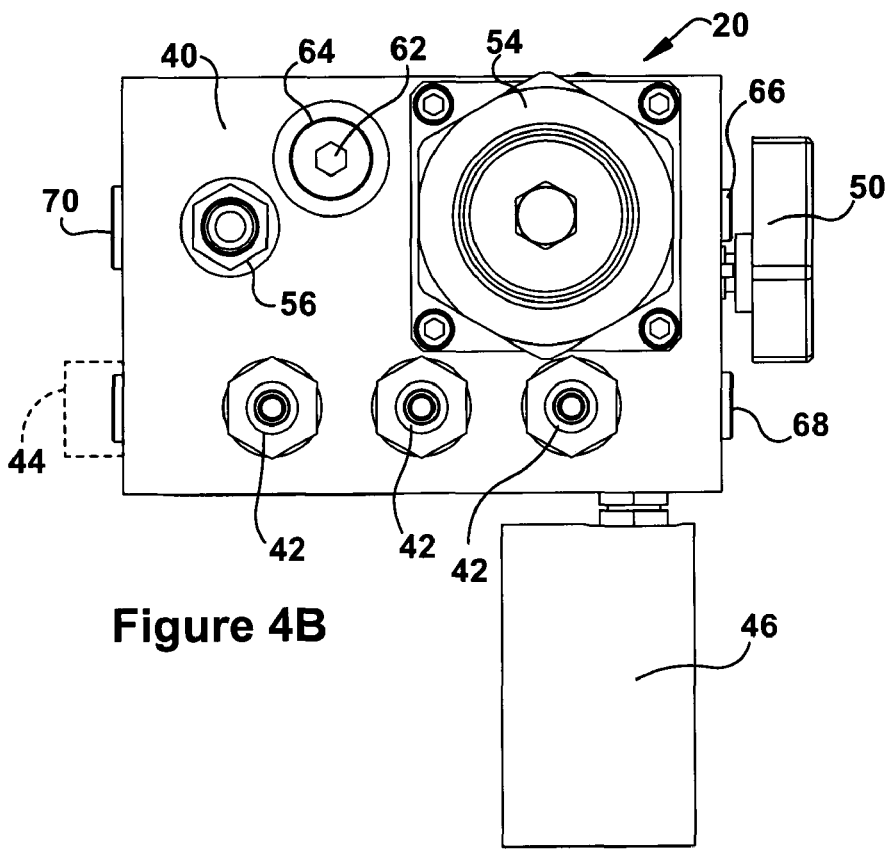
Figure 4C:
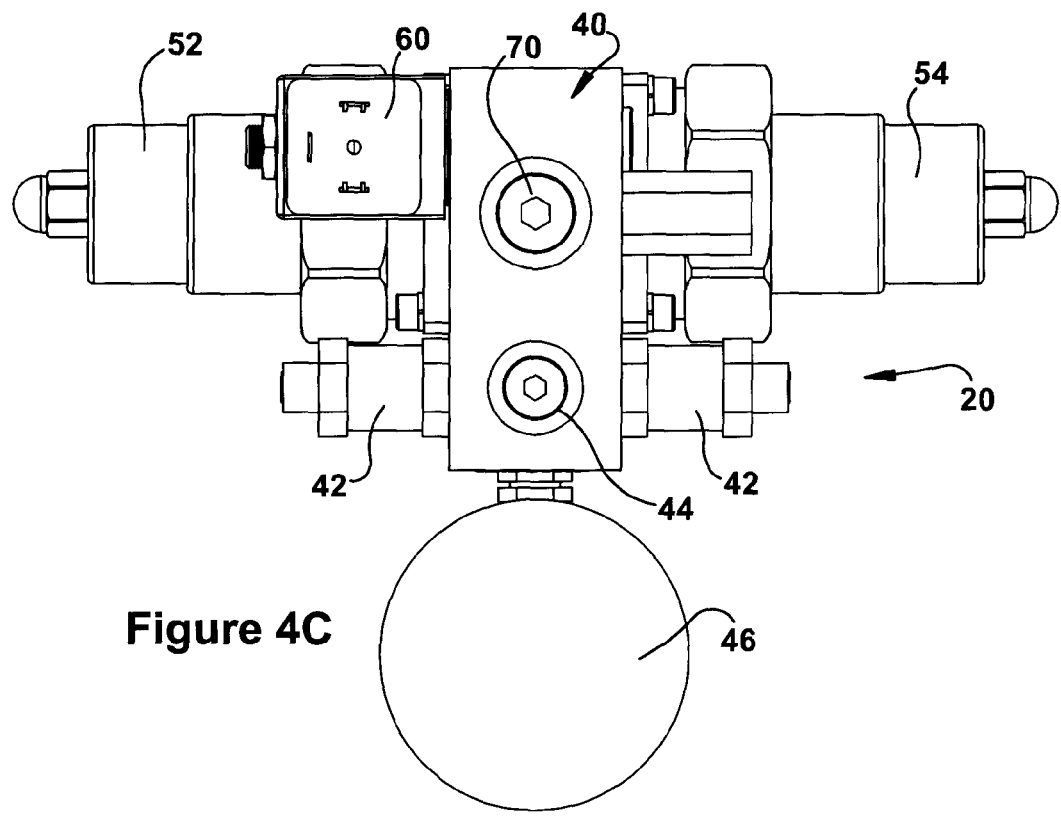
Figure 4D:
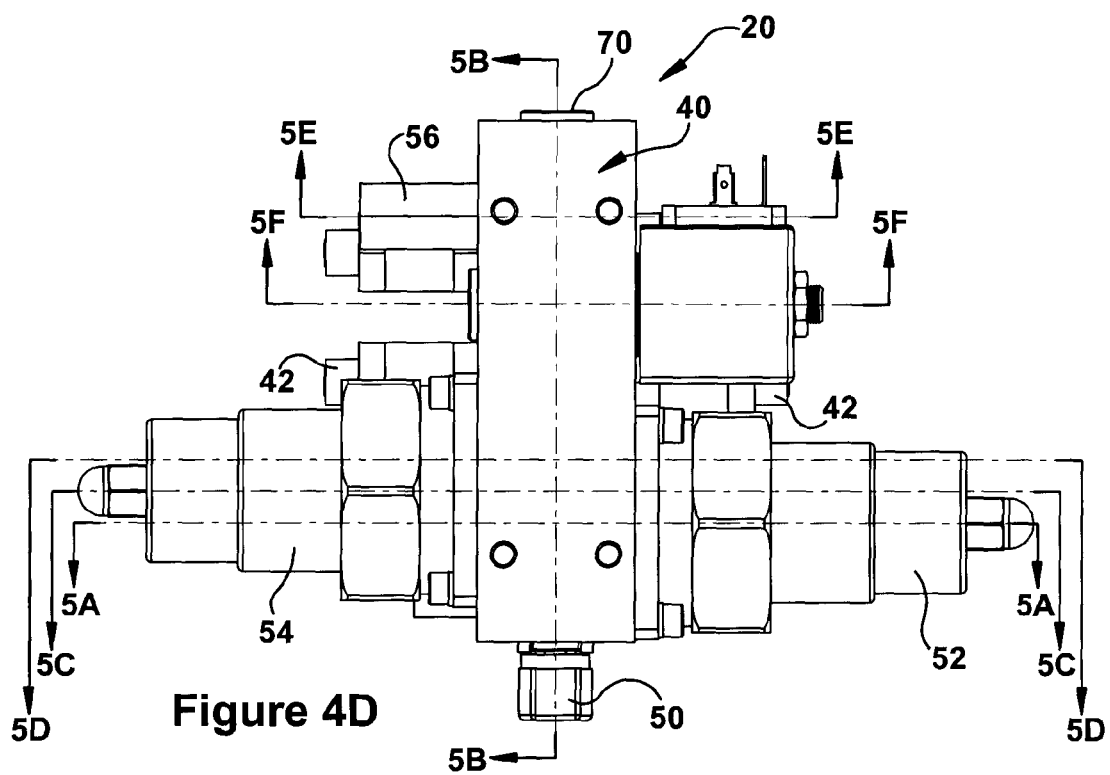

The manifold 40 has ports, cavities, and/or other openings, for accommodating the connection of the components 42, 44, 46, 50, 52, 54, 56, and 60. In the illustrated embodiment, three supply inlet connections 42 are situated on the front side and three supply inlet connections 42 are situated on the rear side of the manifold 40 (FIGS. 3, 4A, 4B and 4C). The pressure transducer 44 is located on the righthand side of the manifold 40 (FIGS. 4A, 4B and 4C), the pressure gauge 46 is located on the bottom side of the manifold 40 (FIGS. 3, 4A, 4B and 4C), and the manual turnoff device 50 (e.g., a ball valve) is located on the lefthand side of the manifold 40 (FIGS. 3, 4A, 4B and 4D). The first pressure-reducing device 52 (e.g., a regulator) is located on the front side of the manifold 40 (FIGS. 3, 4B, 4C, and 4D) and the second pressure-reducing device 54 (e.g. a regulator) is located on the rear side of the manifold 40 (FIGS. 3, 4A, 4C and 4D). The flow-control device 60 (e.g., a normally closed solenoid valve) is located on the front side of the manifold 40 (FIGS. 3, 4A, 4B, 4C and 4D) and the delivery outlet port 62 is situated on the rear side of the manifold 40 (FIG. 4B).

When installed in the fuel cell system 10, the supply lines 24 are connected to the hydrogen sources 22 at one end and connected to the inlet connections 42 at the other end. In a six-bottle system, as shown, this will require six supply lines, or hoses. The delivery outlet port 62 is connected to the delivery line 26 and to the fuel cell stack 12, and this requires a single line or hose. Thus, when installing the illustrated manifold assembly 20 at the fuel cell site, only seven lines (e.g., hoses) and seven connections are required. More generally, a hose (or other line) for each source 22 and an outlet hose (or other line) are the only lines and connections required.

Figure 5C:
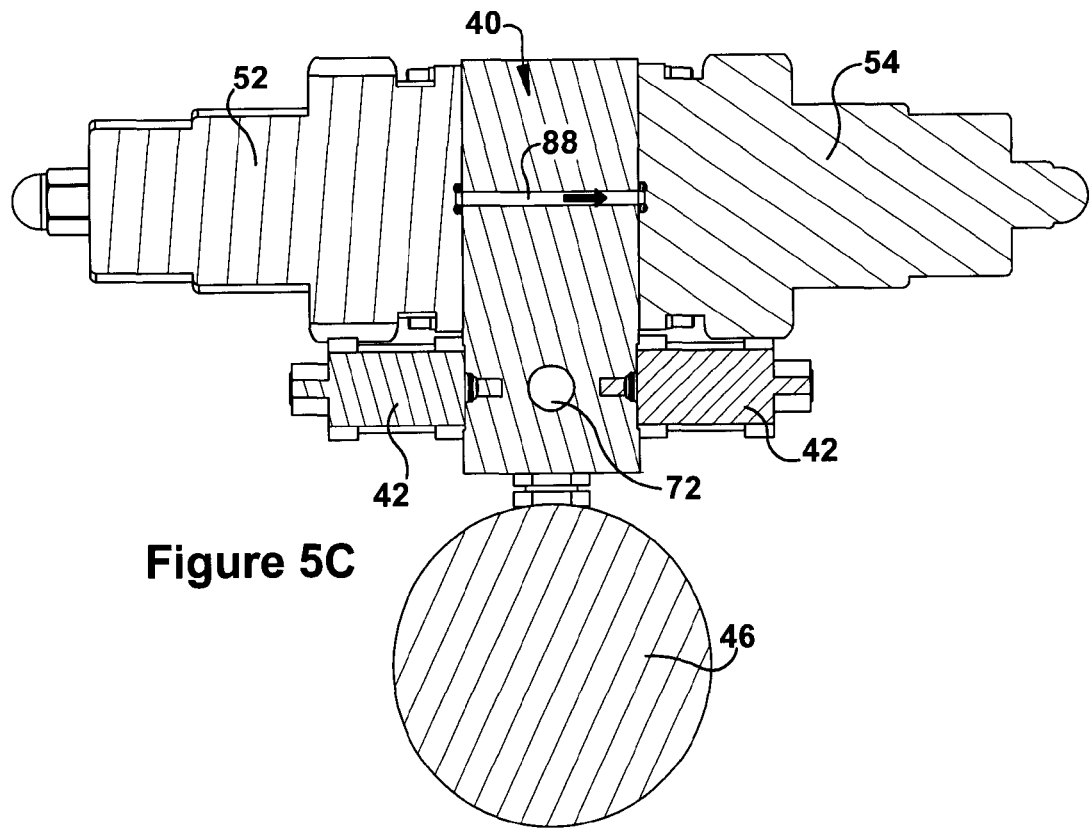

Referring now to FIGS. 5A-5F and FIG. 6, the manifold 40 defines a supply passage 72 and flow passageways 74 from the supply inlet connections 42 into the supply passage 72 (FIG. 5A). In correspondence with the location of the supply inlet connections 42, three passageways 74 enter each side of the supply passage 72 (FIG. 6). This positioning of the inlet connections 42 and/or passageways 74 is compatible with fuel bottles 22 arranged in two rows, such as on the floor of the cabinet of the second compartment 34 (FIG. 2). In any event, one way flow directing devices 76 (e.g., check valves) can be situated in each passageway 74 upstream of the supply passage 72 and/or incorporated into each of the inlet connections 42 (FIG. 6). This allows the removal/replacement of one source bottle 22 while the other bottles 22 continue to supply the hydrogen-containing gas to the fuel cell system 10.

The manifold 40 defines further flow passages 80, 82, 84, 86, 88, 90, 92, 94, 96 and 98 which, in combination with supply passage 72, form a flow path for the hydrogen-containing gas from the inlet connections 42 to the delivery outlet port 62 while interacting with the relevant components (FIG. 6).

The pressure transducer 44 is connected to the upstream end of the supply passage 72 and the passageway 80 splits from the supply passage 72 for connection to the pressure gauge 46 (FIG. 5B and FIG. 6). The passage 72 leads to the passage 82, which can be blocked by the manual turnoff device 50 (when closed) to prevent further flow through the downstream passages (FIG. 5B and FIG. 6). The manual turnoff device 50 can be used, for example, to terminate flow when servicing or inspecting the fuel supply manifold assembly 20. The plugged opening 66 is located upstream of the turnoff device 50 and the plugged opening 68 is located downstream of this device.

Figure 5D:
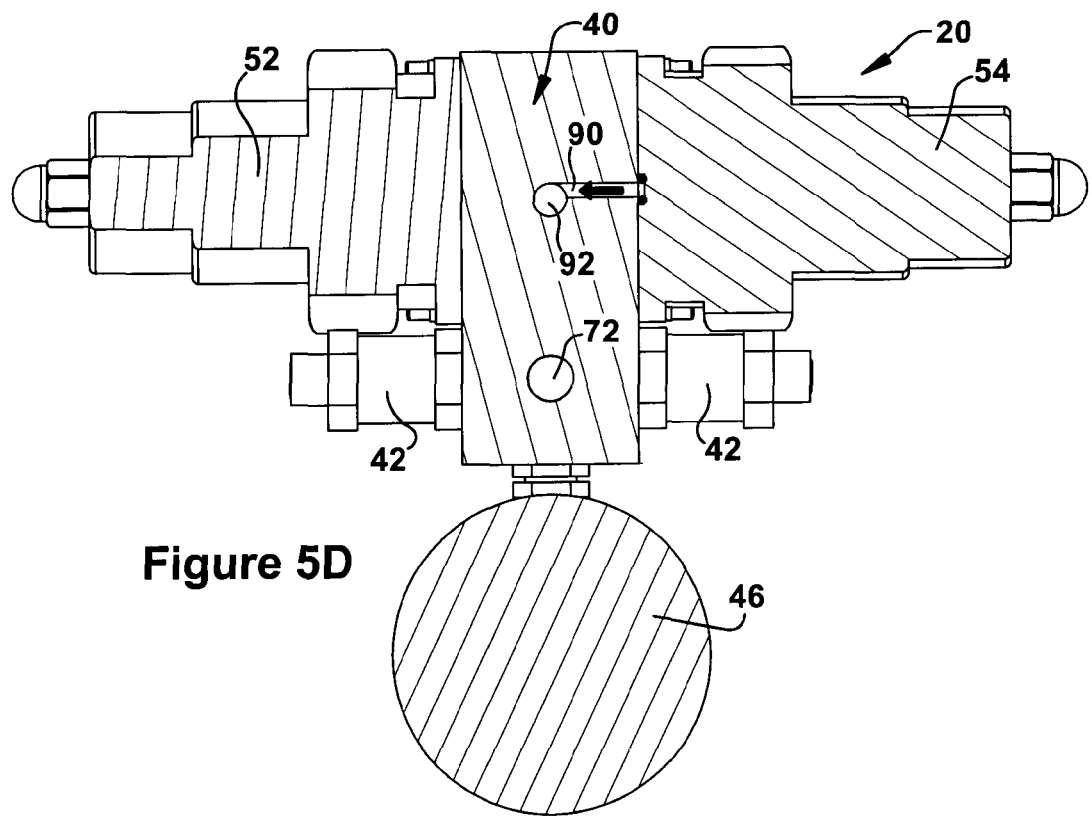

The passage 84 (FIG. 5B and FIG. 6) leads to the passage 86 which leads to the first pressure-reducing device 52 (FIG. 5A and FIG. 6). The passage 88 leads from the first pressure-reducing device 52 to the second pressure-reducing device 54 (FIG. 5C and FIG. 6). The passage 90 leads from the pressure-reducing device 54 to the passage 92 (FIG. 5D and FIG. 6). The pressure-reducing device 52 and/or the pressure-reducing device 54 can be a self-contained component with the manifold 40 defining inlet/outlet passages (passages 86, 88, and 90) and the pressure-reducing components contained within the device 52/54 itself. Alternatively, the inlet/outlet passages as well as pressure-reducing components can be formed in the manifold 40.

The first device 52 can be designed to greatly reduce the supplied hydrogen-containing gas (e.g., at a pressure of about 2000 psi to about 3500 psi) to a much lower pressure (e.g., from about 100 psi to 200 psi) and the second device 54 can be designed to then lower the pressure to the desired cell-introduction pressures (e.g., from about 5 psi to about 6 psi). The first device 52 is intended to carry the lion's share of pressure reduction, decreasing the pressure by at about least 90%, and the second device 54 is intended to fine-tune the drastically reduced pressure so that it is at the desired delivery pressure. Thus, the first device 52 can have very generous tolerance requirements as to outlet pressure and the second device 54 can have tighter tolerance requirements to insure that the hydrogen-containing gas is delivered to the fuel cell stack 12 at a suitable pressure. That being said, a manifold supply assembly 20 with less pressure-reducing devices (e.g., one device) or more pressure-reducing devices is certainly possible and contemplated.

As was indicated above, the pressure transducer 44 is connected to the upstream end of the supply passage 72 and thus is in parallel with the pressure-reducing devices 52/54 (FIG. 5B and FIG. 6). In this manner, the transducer 44 can function as a switch with a preset factory rating to stop flow to the fuel cell stack 12 if pressure is not within a predetermined range (e.g., about 15% to 20% of the supply pressure). Specifically, for example, the transducer 44 can send a signal to the controlling processor to close the flow-controlling device 60 (e.g., return the solenoid valve to its normally closed condition) and prevent flow therethrough.

Figure 5E:
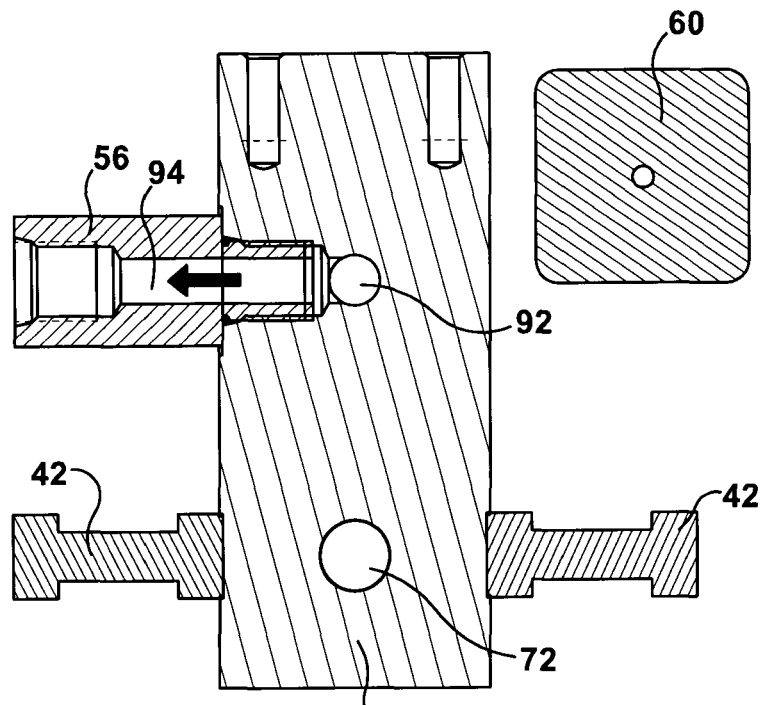
Figure 5F:
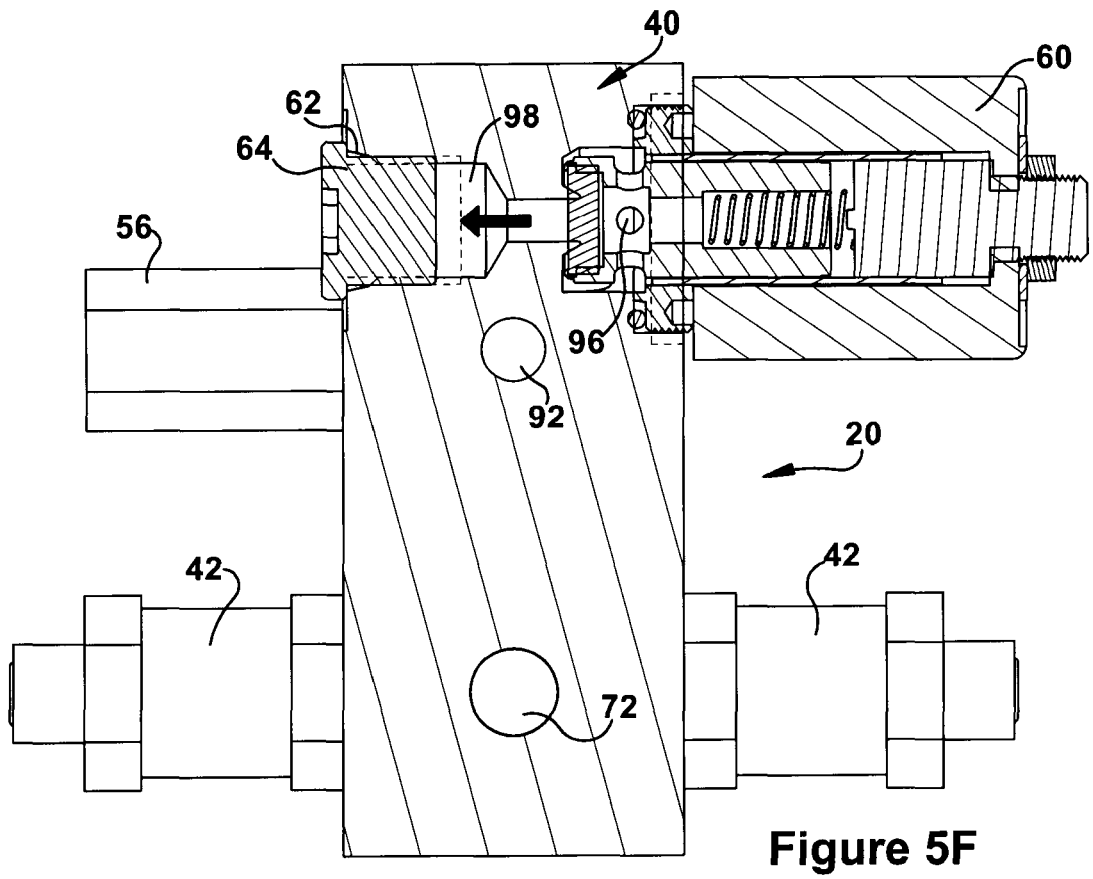

The passage 90 leads from the second pressure-reducing device 54 to the passage 92 (FIGS. 5D and 5F, and FIG. 6) which splits into the passage 94 to the pressure-relieving device 56 (FIG. 5E and FIG. 6). The passage 92 also leads to passage 96 to the flow-controlling device 60 (FIGS. 5B and 5F, and FIG. 6). The passage 98 leads from the control device 60 to the delivery outlet port 62 (FIG. 5F and FIG. 6). The pressure-relieving device 56 protects against malfunction of the pressure-reducing devices 52 and 54 and/or malfunction of the flow-control device 60.

One may now appreciate that the fuel supply manifold assembly 20 incorporates, in a single package, the components necessary for supplying a pressurized hydrogen-containing gas to the fuel cell stack 12. No separate connections, tubing, hoses, or other plumbing is required to integrate pressure sensors (e.g., the transducer 44 and/or the gauge 46), manual flow controllers (e.g., the turnoff device 50), pressure regulators (e.g., the pressure-reducing devices 52 and 54), over-pressure protection (e.g., the pressure-relieving device 56), open/close gates (e.g., the flow-control device 60), and/or other components into the system 10.

Although the fuel supply manifold assembly 20 has been shown and described with respect to a certain embodiment, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. Additionally, any directional modifiers (e.g., top, bottom, upper, lower, side, upward, downward, lefthand, righthand, etc.) are used for ease in explanation in describing the illustrated orientation. Unless otherwise noted, such directional modifiers are not intended to be limiting as to any particular orientation.

The invention claimed is:

1. A fuel supply manifold assembly comprising:
   one or more supply inlet connections for connection to a fuel source;
   a delivery outlet port for connection to a delivery line to a fuel cell stack;
   a pressure-reducing device for reducing fuel pressure;
   a manifold that is a single component which does not require separate tubes, hosing, or plumbing for interconnection between its various parts, wherein the manifold defines passages forming a flow path from the supply inlet connection(s) through the pressure-reducing device and to the delivery outlet port; and
   a flow-control device through which the flow path passes, the flow-control device being located downstream of the pressure-reducing device and upstream of the delivery outlet port;
   wherein the flow-control device is a solenoid valve.

2. A fuel supply manifold assembly as set forth in claim 1, further comprising a second pressure-reducing device downstream of the first pressure-reducing device and upstream of the delivery outlet port.

3. A fuel supply manifold assembly as set forth in claim 1, wherein the flow path comprises a passageway through each inlet connection and wherein a flow-direction device prevents flow in an upstream direction in each passageway.

4. A fuel supply manifold assembly as set forth in the claim 3, wherein the flow-direction device is a check valve.

5. A fuel supply manifold assembly as set forth in claim 1, comprising a plurality of inlet connections.

6. A fuel supply manifold assembly as set forth in claim 5, wherein the inlet connections are situated on opposite sides of the manifold.

7. A fuel supply manifold assembly as set forth in claim 1, further comprising a pressure reader which reads the pressure of fluid in the flow path.

8. A fuel supply manifold assembly as set forth in claim 7, wherein the pressure reader is a pressure gauge and/or a pressure transducer.

9. A fuel supply manifold assembly as set forth in claim 8, wherein the pressure reader is a pressure transducer positioned in the flow path parallel with the pressure-reducing device.

10. A fuel supply manifold assembly as set forth in claim 1, further comprising a manual turnoff device which, when moved to a closed position, blocks the flow path upstream of the delivery outlet port.

11. A fuel supply manifold assembly as set forth in claim 10, wherein the manual turnoff device is positioned upstream of the pressure-reducing device.

12. A fuel supply manifold assembly as set forth claim 1, further comprising a pressure-relieving device through which the flow path passes.

13. A fuel supply manifold assembly as set forth in claim 12, wherein the pressure-relieving device is positioned downstream of the pressure-reducing device.

14. A fuel supply manifold assembly as set forth claim 13, wherein the pressure-relieving device is positioned in the flow path parallel with the flow-control device.

15. A fuel supply manifold assembly as set forth in claim 1, further comprising:
   a solenoid valve located in the flow path downstream of the pressure-reducing device and upstream of the delivery outlet port;
   a pressure-relief valve located in the flow path downstream of the pressure-reducing device and upstream of the delivery outlet port; and/or
   a ball valve located in the flow path upstream of the pressure-reducing device.

16. A fuel cell system comprising a fuel cell stack, a fuel source, and a fuel supply manifold assembly as set forth in claim 1, the fuel source being connected to the inlet connections and the delivery outlet port being connected to a delivery line to the anode side of the fuel cell stack.

17. A fuel cell system as set forth in claim 16, wherein the fuel source is a source of a hydrogen-containing gas.

18. A fuel cell system as set forth in claim 16, wherein the delivery line extends from the manifold assembly in a first compartment to a second compartment for delivery of fuel to the fuel cell stack.

* * * * *